(12) United States Patent
Murley

(10) Patent No.: US 6,997,126 B2
(45) Date of Patent: Feb. 14, 2006

(54) OFFSET SEAM SEWING PROCESS

(75) Inventor: Kimberly Murley, Orion Township, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 34 days.

(21) Appl. No.: 10/686,251

(22) Filed: Oct. 15, 2003
(Under 37 CFR 1.47)

(65) Prior Publication Data
US 2005/0081770 A1    Apr. 21, 2005

(51) Int. Cl.
*D05B 15/00* (2006.01)
*D05B 35/00* (2006.01)

(52) U.S. Cl. .................. 112/475.06; 112/475.08; 112/470.27

(58) Field of Classification Search ........... 112/475.06, 112/475.08, 475.03, 153, 51, 306, 470.27, 112/141, 147, 149; D06/356, 374; 297/218.1, 297/DIG. 1, DIG. 2
See application file for complete search history.

(56) References Cited

U.S. PATENT DOCUMENTS

| | | | |
|---|---|---|---|
| 2,576,324 A * | 11/1951 | Wirt .......................... 112/419 |
| 3,671,984 A * | 6/1972 | Ambrose ...................... 5/402 |
| 4,063,524 A * | 12/1977 | Ochiai ........................ 112/152 |
| 4,899,674 A | 2/1990 | Kawasaki |
| 5,016,941 A | 5/1991 | Yokota |
| 5,603,275 A | 2/1997 | Kawasaki |
| 5,669,670 A | 9/1997 | Haraguchi et al. |
| 5,687,662 A | 11/1997 | Kawasaki |
| 5,722,336 A | 3/1998 | Takeuchi |
| 5,732,641 A | 3/1998 | Kawasaki |
| 6,164,226 A | 12/2000 | Takei |
| 6,505,570 B1 | 1/2003 | Sakamoto et al. |
| 6,792,883 B1 * | 9/2004 | Ashton ................... 112/475.01 |
| 2002/0152939 A1 | 10/2002 | Ashton |

* cited by examiner

*Primary Examiner*—Ismael Izaguirre
(74) *Attorney, Agent, or Firm*—Raggio & Dinnin, P.C.

(57) ABSTRACT

A process for joining adjacent panels of plural layered upholstery, including the steps of adjacently positioning first and second panels, each having an offset backing and exterior layers, and substantially aligning longitudinal peripheries of the first and second panels. Stitching the panels together along a first stitching line positioned inboard of the longitudinal peripheries and substantially parallel thereto, and stitching portions of the first and second panels outboard of the first stitching line to an inboard portion of one or more of the panels along at least a second stitching line. In a preferred embodiment, the exterior layer in the first panel is offset laterally relative to the backing layer in an inboard direction, wherein the lateral offset imparts a substantially regular contour to portions of the exterior layer proximate the first stitching line and inboard thereof.

21 Claims, 2 Drawing Sheets

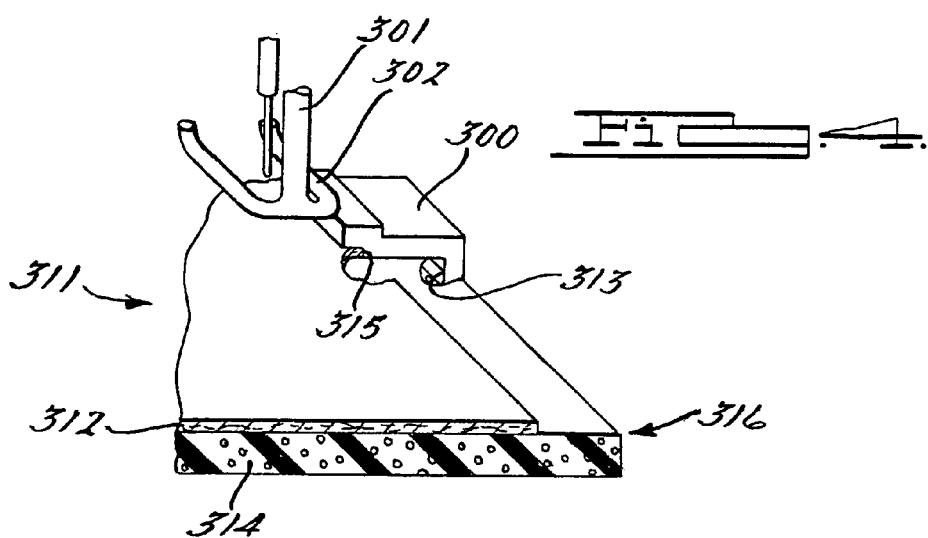
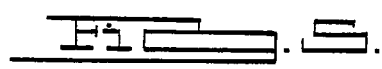
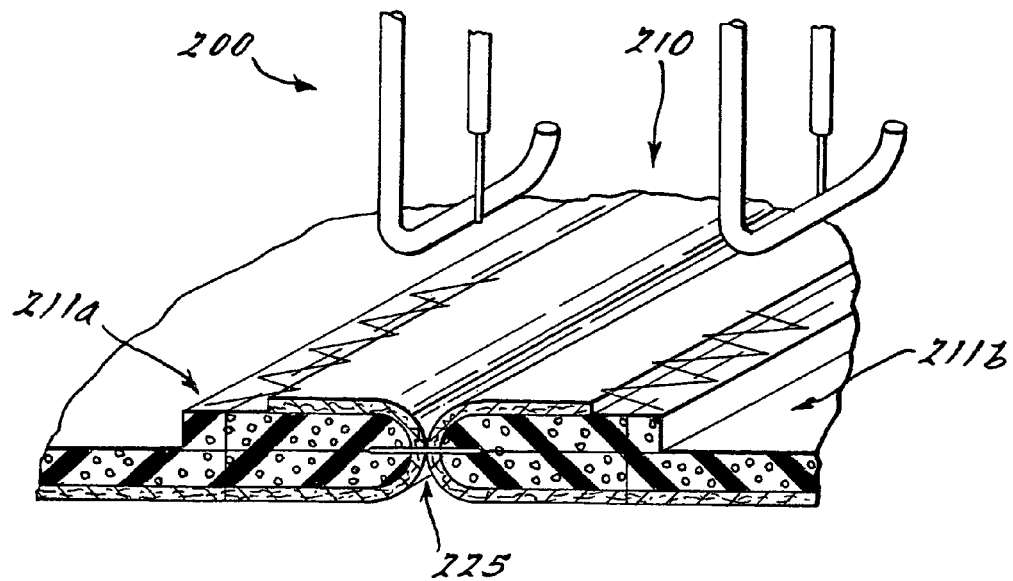

US 6,997,126 B2

OFFSET SEAM SEWING PROCESS

TECHNICAL FIELD

The present invention relates generally to processes for sewing upholstery seams, and more particularly to a process for joining edges of panels of plural-layer upholstery material comprising backing and exterior layers laterally offset along the edges to be joined.

BACKGROUND OF THE INVENTION

Automotive engineers and designers have long sought to create vehicles having aesthetically pleasing exterior and interior designs. Exterior designs have become increasingly uniform over the years. Hence, the importance of uniqueness and aesthetic appeal in the automotive interior has grown. Attractive upholstered coverings for interior trim, seats, and steering wheels are a hallmark of the modern, high-quality automobile. Ever-higher customer quality demands continue to raise the bar for commercial acceptability, and aesthetic appeal has become paramount in the sale of higher profit margin vehicles. Accordingly, attention has turned to less traditional elements of interior design. One example of such new focus involves the appearance of seams in upholstered interior components such as seats and headrests.

A problem whose resolution has long confounded designers is wrinkling proximate the seam at which adjacent upholstery panels or sheets are joined. This phenomenon has been shown to be particularly acute where the interface of adjacent upholstery sheets involves a curve, for example the ends of headrests, and various other contoured portions of vehicle seats. Because the otherwise flat material must be stretched, compressed or otherwise strained to form a curved shape, buckling, known in the art as "knuckling" tends to occur around seam regions. Thus, an otherwise smoothly curving outer upholstery surface can exhibit unsightly knuckling adjacent the curving region where the sheets cover the headrest interface. Addressing this phenomenon can slow the manufacturing process, which in turn raises manufacturing cost—a highly undesirable effect. It is preferred to have an upholstery sewing process which is simple to perform and reduces sewing time.

Various methods have been developed to address the "knuckling" problem, however, most have met with only limited success. The present invention is directed at least in part to one or more problems or shortcomings associated with the related art.

SUMMARY OF THE INVENTION

It is an object of the present invention to provide a means for improving the appearance of upholstered vehicle interior parts by reducing knuckling along upholstery seams.

In accordance with the above and other objects, the present invention provides a process for joining adjacent panels of plural-layer upholstery. The process preferably includes the step of positioning a first upholstery panel having offset backing and exterior layers adjacent a second upholstery panel having offset backing and exterior layers. The process preferably further includes the steps of substantially aligning longitudinal peripheries of the first and second panels, and stitching the first and second upholstery panels together along a first stitching line positioned inwardly of the longitudinal peripheries and substantially parallel thereto. The process preferably further includes the step of stitching portions of the first and second panels outboard of the first stitching line to an inboard portion of one or more of the panels along at least a second stitching line. In a preferred embodiment, the exterior layer in the first panel is offset laterally relative to the backing layer in an inboard direction, wherein the lateral offset imparts a substantially regular contour to portions of the exterior layer proximate the first stitching line and inboard thereof.

BRIEF DESCRIPTION OF THE DRAWINGS

FIG. 4 is a partially sectioned side view of a sewing apparatus in accordance with a preferred embodiment of the present invention;

FIG. 5 is a partially sectioned side view of a sewing apparatus in accordance with a preferred embodiment of the present invention.

DETAILED DESCRIPTION OF PREFERRED EMBODIMENTS

Figure 1:
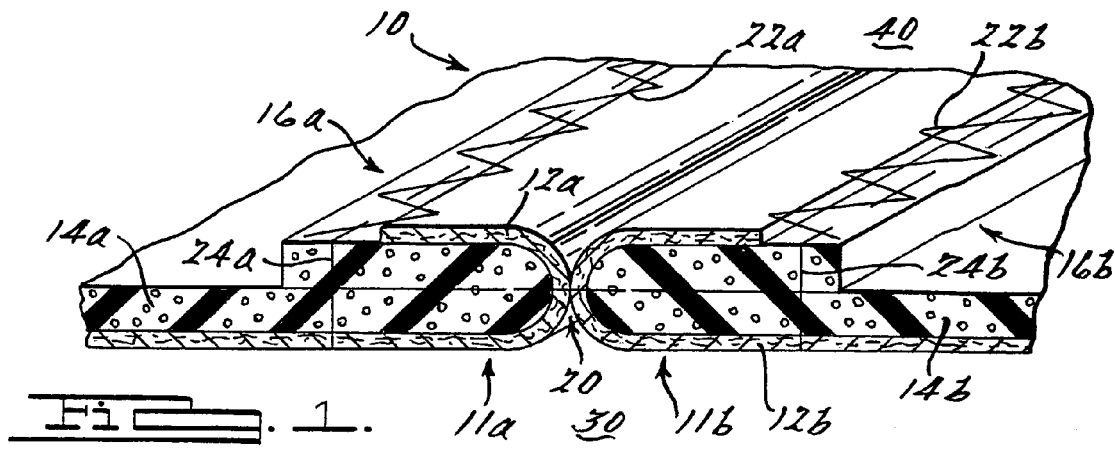
FIG. 1 is a sectioned side view of a plural-layer upholstery seam manufactured in accordance with a preferred embodiment of the present invention.
Figure 2:
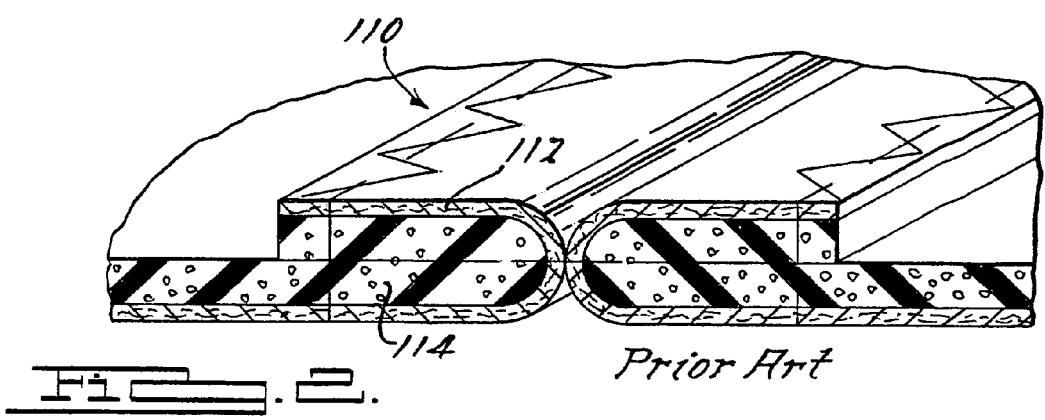
FIG. 2 is a sectioned side view of a plural-layer upholstery seam according to a previously known design.

Referring to FIG. 1, there is shown an upholstery seam 10 manufactured in accordance with a preferred embodiment of the present invention. Broadly, the present invention provides a process for joining adjacent panels 11a and 11b of plural-layer upholstery, and in particular is contemplated for use with upholstery panels having a leather or imitation leather exterior layer and a foam backing layer. Accordingly, each of the panels 11a and 11b in the FIG. 1 embodiment includes exterior layers 12a and 12b and foam backing layers 14a and 14b. As illustrated in FIG. 1, panels 11a and 11b are joined along a stitching line that is a longitudinal join sew 20. Join sew 20 is positioned "inboard" of longitudinal edges 16a and 16b of panels 11a and 11b, respectively. As used herein, the term "inboard" should be understood to mean a direction substantially away from longitudinal edges 16a and/or 16b, whereas the term "outboard" refers to an opposite direction, i.e. toward edges 16a and/or 16b. Exterior layers 12a and 12b are preferably laterally offset in an inboard direction relative to backing layers 14a and 14b, therefore yielding an expanse of exposed foam 18a and 18b on each panel proximate longitudinal edges 16a and 16b, respectively. Overcast stitching designs and machines (not shown) are well known in the art and may be used to join backing layers 14a and 14b to exterior layers 12a and 12b, respectively, along longitudinal edges 16a and 16b. Preferably, the respective backing and exterior layers are connected with overcast stitching prior to forming join sew 20. Referring to FIG. 2, there is shown a seam 110 in accordance with a known design wherein the respective backing and exterior layers 112 and 114, respectively, are not laterally offset.

Returning to FIG. 1, zigzag stitching lines 22a and 22b are optionally formed proximate longitudinal edges 16a and 16b. Stitching lines 22a and 22b are preferably formed such that the stitches placed through panels 11a and 11b alternate between piercing both of the backing 14a, 14b and the exterior 12a, 12b layers, and piercing only the backing 14a, 14b. It is unnecessary to utilize zigzag stitches at all, it is merely necessary that the portions of panels 11a and 11b that are outboard of join sew 25 be attached to the portions of panels 11a and 11b that are inboard of join sew 25. This may be achieved with zigzag stitches 22a and 22b, or longitudinal stitches 24a and 24b, preferably placed proximate and substantially parallel to longitudinal edges 16a and 16b. Further still, it is unnecessary to utilize stitches at all. Glue might be used to attach the inboard and outboard portions without departing from the scope of the present invention. Longitudinal stitches 24a and 24b preferably pass all the way through panels 11a and 11b from an interior side 40 to an exterior side 30 of seam 10, and are therefore preferably visible from exterior side 30, preferably the exterior surface of an upholstered vehicle part. The construction illustrated in FIG. 1 is similar to a type of seam known in the art as a French seam.

In an alternative embodiment (not shown), the present invention provides a process whereby a "deck" seam is manufactured in a manner similar to a French seam, but with several differences. In particular, the deck seam is manufactured by folding the portions of panels 11a and 11b that are outboard of join sew 25 against either of the inboard portions of panels 11a and 11b. Rather than "butterflying" the outboard portions, thereby folding them in opposite directions as in the FIG. 1 embodiment, the outboard portions are preferably maintained substantially in parallel and folded together to one side of seam 10, and stitched to one of panels 11a or 11b.

Figure 3:
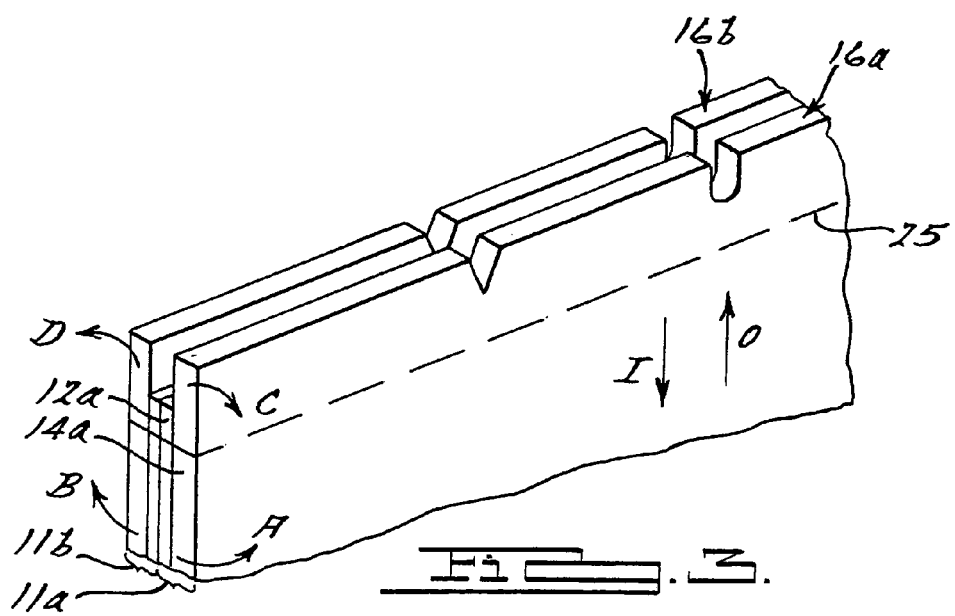
FIG. 3 is a perspective view of adjacent panels of plural-layer upholstery in accordance with a preferred embodiment of the present invention.

In relation to the above-described embodiments, the present invention provides a process for joining adjacent edges of plural-layer upholstery panels. In particular, the process is contemplated for use with upholstery panels where, for example, one of the panels has a curved edge. Referring now to FIG. 3, the process initially includes the step of positioning a first upholstery panel 11a having laterally offset backing 14a and exterior 12a layers adjacent a second upholstery panel 11b, and substantially aligning longitudinal edges 16a and 16b thereof. Once aligned thusly, the first and second upholstery panels 11a and 11b are stitched together along join sew 25, positioned inboard of longitudinal edges 16a and 16b. In FIG. 3, an inboard direction is identified generally by arrow "I" whereas an outboard direction is identified generally by arrow "O". The stitching line 25 is oriented substantially parallel to longitudinal edges 16a and 16b. Next, portions of the first and second upholstery panels 11a and 11b outboard of stitching line 25 are folded relative to respective portions inboard of stitching line 25. It should be appreciated that it is the relative folding that is important, not which portions are actually manipulated. Thus, the step preferably takes place by pulling portions of panels 11a and 11b that are inboard of stitching line 25 apart. In FIG. 3, the direction of separation of the panels is shown generally by arrows A and B. Preferably, the portions of panels 11a and 11b that are outboard of stitching line 25 are also separated, the directions of which are shown generally by arrows C and D. The folding step described yields a configuration substantially similar to the illustration of seam 10 in FIG. 1, albeit in a state prior to forming stitching lines 22a, 22b or 24a, 24b. Once the panels 11a and 11b have been folded substantially into the butterfly configuration shown in FIG. 1, the portions of panels 11a and 11b outboard of stitching line 25 can be stitched to the respective portions of the panels 11a and 11b that are inboard of stitching line 25, completing a French seam type construction. The lateral offset of the exterior layers 12a and 12b reduces the quantity of exterior layer material proximate longitudinal edges 16a and 16b, thereby imparting a substantially regular, i.e. unwrinkled, contour to the exterior layer 12a, 12b proximate and inboard of stitching line 15. Thus, when the described upholstery joining process is used to join adjacent panels of upholstery for interior trim members in a vehicle, the result is a substantial advance in reducing knuckling over the related art process and designs.

An additional embodiment (not shown) relates to an application of the presently described process wherein a seam similar to a deck seam is formed. The process takes place with steps similar to those set forth above, however, rather than butterflying the portions of the panels outboard of the join sew, the outboard portions are folded against main body portions of the panels, while maintained substantially parallel, and then stitched thereto.

In a preferred embodiment, the degree of lateral offset of exterior layer 11a, 11b relative to backing layer 14a, 14b is in the range of about 10% to about 90% of the width of backing layers 14a and 14b that lie outboard of join sew 20. Offsetting the layers in this general range has been found to reduce knuckling of the upholstery material in regions proximate the join sew 20, imparting a substantially regular, i.e. smoothly curving, surface to the exterior layers. Most preferably, the degree of lateral offset is equal to about 50% of the width of the backing layers 14a and 14b outboard of the join sew 20. It should be appreciated that it is unnecessary to provide upholstery panels that are both configured with the described lateral offset of the layers, however, it is generally preferred to construct both panels substantially the same. Further, the present invention is applicable to upholstery designs wherein one or both of the panels to be joined includes a curved edge. It is contemplated that the present invention is well suited to seams at the ends of substantially cylindrical headrests wherein a generally cylindrical plural-layer upholstery panel is joined to a generally circular panel. Similarly, the invention is applicable to seams proximate seat shoulders, and indeed any place in the vehicle where adjacent plural layer upholstery panels are joined.

Turning to FIG. 5, there is shown a dual needle rig 200 whereby zigzag or some other type of stitching can be made to both sides of a seam 210 that has been constructed, stitched and butterflied, to produce a French-type seam in accordance with a preferred embodiment of the present invention. In the FIG. 5 embodiment, either the needles or the upholstery can be moved to allow stitching that attaches the portions of the panels 211a, 211b outboard of a join sew 225 to inboard portions of panels 211a, 211b.

Turning now to FIG. 4, there is shown a fixturing member 300 used in cooperation with a sewing needle assembly 301 to sew adjacent exterior and backing layers 312 and 314, respectively, at a prescribed lateral offset along a longitudinal edge 316. It should be appreciated that the apparatus shown in FIG. 4 is not necessary for carrying out the various embodiments of the present invention described herein; however, it represents one preferred means for preparing upholstery panels having the desired specifications. Fixturing member 300 is preferably a metallic member having a plurality of ledges 313, 315 that abut layers 314 and 312, respectively. In a preferred embodiment, fixturing member 300 is secured relative to needle assembly 301 (it may be attached to the machine body—not shown), and is moved with needle assembly 301 relative to longitudinal edge 316 of the upholstery panel 311, maintaining the desired lateral offset of the respective layers while they are stitched together.

The present description is for illustrative purposes only, and should not be taken to limit the scope of the present invention in any fashion. Those skilled in the art will appreciate that various modifications might be made to the embodiments disclosed herein without departing from the scope and spirit of the present invention. Other aspects, features and advantages will be apparent upon an examination of the attached drawing figures and appended claims.

What is claimed is:

1. A process for joining adjacent edges of plural-layer upholstery panels, wherein at least one of the edges is a curved edge, the process comprising the steps of:
    positioning a first upholstery panel having laterally offset backing and exterior layers adjacent a second upholstery panel and substantially aligning longitudinal edges thereof;
    stitching the first and second upholstery panels together along a stitching line positioned inboard of the longitudinal edges and substantially parallel thereto;
    folding portions of the first and second upholstery panels outboard of the stitching line in opposite directions, and positioning the folded portions against respective portions of the first and second panels inboard of the stitching line;
    attaching the folded portions to the first and second panels;
    wherein the exterior layers of at least the first panel are laterally offset in an inboard direction, thereby imparting a substantially regular contour to the exterior layer proximate and inboard of the stitching line.

2. The process of claim 1 wherein the step of stitching the folded portions comprises zigzag stitching the folded portions, whereby stitches piercing both of the exterior and backing layer alternate with stitches piercing the backing layer and not piercing the exterior layer.

3. The process of claim 1 wherein the backing layer and the exterior layer are offset a distance in the range of about $1/10$ to about $9/10$ the width of the backing layer outboard of the stitching line.

4. The process of claim 3 wherein the backing layer and the exterior layer are offset a distance in the range of about $1/2$ the width of the backing layer outboard of the stitching line.

5. The process of claim 1 wherein the second upholstery panel comprises laterally offset backing and exterior layers.

6. The process of claim 1 wherein the exterior layer is real or synthetic leather and the backing layer is foam.

7. An interior trim member for a motor vehicle having an upholstery covering sewn according to the process of claim 1.

8. A process for joining adjacent edges of plural-layer upholstery panels, wherein at least one of the edges is a curved edge, the process comprising the steps of:
    positioning a first upholstery panel having laterally offset backing and exterior layers adjacent a second upholstery panel and substantially aligning longitudinal edges thereof;
    stitching the first and second upholstery panels together along a stitching line positioned inboard of the longitudinal edges and substantially parallel thereto;
    folding portions of the first and second upholstery panels outboard of the stitching line against a portion of the first or second panel that is inboard of the stitching line;
    attaching the folded portions to the panel against which it is folded;
    wherein the exterior layer of at least the first panel is laterally offset in an inboard direction, thereby imparting a substantially regular contour to the exterior layer proximate and inboard of the stitching line.

9. The process of claim 8 wherein the backing layer and the exterior layer are offset a distance in the range of about $1/10$ to about $9/10$ the width of the backing layer outboard of the stitching line.

10. The process of claim 9 wherein the backing layer and the exterior layer are offset a distance of about $1/2$ the width of the backing layer outboard of the stitching line.

11. The process of claim 8 wherein the second upholstery panel comprises laterally offset backing and exterior layers.

12. The process of claim 8 wherein the exterior layer is real or synthetic leather and the backing layer is foam.

13. An interior trim member for a motor vehicle having an upholstery covering sewn according to the method of claim 8.

14. An upholstered interior trim member in a motor vehicle having an upholstery seam sewn according to a method comprising the steps of:
    positioning a first upholstery panel having offset backing and exterior layers adjacent a second upholstery panel having offset backing and exterior layers;
    substantially aligning longitudinal edges of the first and second panels;
    stitching the first and second upholstery panels together along a first stitching line positioned inboard of the longitudinal peripheries and substantially parallel thereto;
    stitching portions of the first and second panels outboard of the first stitching line to an inboard portion of one or more of the panels along at least a second stitching line;
    wherein the exterior layer in the first panel is offset in an inboard direction relative to the backing layer a distance of at least about $1/10$ a lateral dimension of the backing layer extending between the first and second stitching lines, the lateral offset imparting a substantially regular contour to portions of the exterior layer proximate the first stitching line and inboard thereof.

15. The trim member of claim 14 wherein the step of stitching portions of the first and second panels along at least a second stitching line comprises:
    stitching butterflied portions of the first and second panels outboard of the first stitching line to respective portions of the first and second panels inboard of the first stitching line along second and third stitching lines, respectively.

16. The trim member of claim 14 wherein the step of stitching portions of the first and second panels along at least a second stitching line comprises:
    positioning portions of the first and second panels outboard of the first stitching line substantially in parallel, folding the portions against one of the first and second panels, and stitching the portions thereto along a second stitching line.

17. The trim member of claim 14 wherein the process further comprises the step of laterally offsetting the backing and exterior layers in a plural-layer upholstery covering prior to the steps of positioning and stitching the layers.

18. The trim member of claim 17 further comprising the step of securing a stepped guide relative to a sewing needle apparatus, wherein the stepped guide has a plurality of laterally offset ledges whereby longitudinal edges of backing and exterior layers can be fixtured at laterally offset positions during sewing thereof.

19. The trim member of claim 18 wherein the trim member is a vehicle seat.

20. A process for joining adjacent panels of plural-layer upholstery, the process comprising the steps of:
   sewing laterally offset backing and exterior layers in a first upholstery panel, wherein the backing and exterior layers are positioned adjacently and moved in a stitching direction along a plural-ledge fixturing member, a first ledge being maintained against said backing layer and a second ledge being maintained against said exterior layer, thereby maintaining a substantially constant lateral offset thereof;
   substantially aligning a longitudinal edge of the first upholstery panel with a longitudinal edge of a second upholstery panel;
   stitching the first and second upholstery panels together along a first stitching line positioned inwardly of the longitudinal edges and substantially parallel thereto;
   stitching portions of the first and second panels outboard of the first stitching line to an inboard portion of one or more of the panels along at least a second stitching line;
   wherein the exterior layer in the first panel is offset laterally relative to the backing layer in an inboard direction, the lateral offset imparting a substantially regular contour to portions of the exterior layer proximate the first stitching line and inboard thereof.

21. An upholstered interior trim member manufactured according to the process of claim 20.

* * * * *